US008397885B2

(12) United States Patent
Shiao et al.

(10) Patent No.: US 8,397,885 B2
(45) Date of Patent: Mar. 19, 2013

(54) MAGNETO-RHEOLOGICAL FLUID BRAKE

(75) Inventors: Yaojung Shiao, Taipei (TW);
Cheng-Yang Chang, New Taipei (TW)

(73) Assignee: National Taipei University of Technology (TW)

( * ) Notice: Subject to any disclaimer, the term of this patent is extended or adjusted under 35 U.S.C. 154(b) by 185 days.

(21) Appl. No.: 13/108,119

(22) Filed: May 16, 2011

(65) Prior Publication Data

US 2012/0211315 A1 Aug. 23, 2012

(30) Foreign Application Priority Data

Feb. 22, 2011 (TW) .............................. 100105766 A

(51) Int. Cl.
*F16F 9/53* (2006.01)

(52) U.S. Cl. .................. 188/267.2; 188/267; 188/267.1; 188/164; 188/313; 482/63; 482/111

(58) Field of Classification Search .............. 188/267.2, 188/267, 267.1, 164, 313; 482/5–6, 63, 111; F16F 9/53

See application file for complete search history.

(56) References Cited

U.S. PATENT DOCUMENTS

| 2,575,360 | A | * | 11/1951 | Rabinow | ...................... | 192/21.5 |
| 6,581,731 | B2 | * | 6/2003 | Chen | ............................. | 188/164 |
| 2007/0144842 | A1 | * | 6/2007 | Zhou | ............................. | 188/267 |
| 2009/0309522 | A1 | * | 12/2009 | Seo | ................................ | 318/375 |

* cited by examiner

*Primary Examiner* — Robert A Siconolfi
*Assistant Examiner* — San Aung
(74) *Attorney, Agent, or Firm* — Schmeiser, Olsen & Watts, LLP

(57) ABSTRACT

A magneto-rheological fluid brake includes a housing, a non-magnetically permeable separating ring, a plurality of magnetically permeable blocks, a plurality of magnetically permeable bars, an axle, an upper magnetically permeable block, a lower magnetically permeable block, and a magneto-rheological fluid. The magneto-rheological fluid is surrounded by a plurality of coils and a plurality of pole coils for increasing the area of magnetic permeability of the magneto-rheological fluid subjected to an applied magnetic field. Accordingly, the magneto-rheological fluid brake demonstrates an enhanced braking force and is free from a complete failure of the braking force.

7 Claims, 5 Drawing Sheets

MAGNETO-RHEOLOGICAL FLUID BRAKE

CROSS-REFERENCE TO RELATED APPLICATION

This non-provisional application claims priority under 35 U.S.C. §119(a) on Patent Application No(s). 100105766 filed in Taiwan, R.O.C. on Feb. 22, 2011, the entire contents of which are hereby incorporated by reference.

FIELD OF TECHNOLOGY

The present invention relates to magneto-rheological fluid brakes, and more particularly, to a magneto-rheological fluid brake effective in enlarging the area of magnetic permeability of a magneto-rheological fluid under an applied magnetic field to increase a braking force and preventing a complete failure of the braking force.

BACKGROUND

Magnetorheological fluids (MRF) fall within a category of smart materials being developed. Under an applied magnetic field, solid magnetizable particles in a magneto-rheological fluid are in chainlike alignment with magnetic lines connected between the north pole and the south pole and thus produce resistance to a shear stress.

Conventional magneto-rheological fluid brakes are, basically, cylindrical in shape, and each essentially comprise a housing and a disc body. The disc body is surrounded by magnetically permeable blocks (or silicon steel plates) of a symmetric C-shaped cross-section. Coils are wound around the magnetically permeable blocks (or silicon steel plates) to generate an applied magnetic field. A magneto-rheological fluid is evenly distributed in the space between the disc body and the magnetically permeable blocks.

Referring to FIG. 1, there is shown a cross-sectional view of a conventional magneto-rheological fluid brake 9. As shown in the drawing, the conventional magneto-rheological fluid brake 9 is characterized in that: an axle 92 and a disc body 93 which are connected to each other are axially disposed in a housing 91; the disc body 93 is surrounded by magnetically permeable blocks 94 (or silicon steel plates) of a symmetric C-shaped cross-section; a coil 95 is wound around the magnetically permeable blocks 94 (or silicon steel plates) to generate an applied magnetic field; and a magneto-rheological fluid 96 is evenly distributed in the space between the disc body 93 and the magnetically permeable blocks 94.

The magnetically permeable blocks 94 of a symmetric C-shaped cross-section is a limiting factor in the area of magnetic permeability of the magneto-rheological fluid 96 under an applied magnetic field, and in consequence a braking force exerted in the direction of magnetic lines indicated by the arrows shown in FIG. 1 is relatively weak.

In addition, the conventional magneto-rheological fluid brake 9 comprises one and only one said 95; hence, when the coil 95 is damaged or severed, the brake 9 undergoes a loss of the applied magnetic force and thereby causes a complete failure of the braking force, which poses a serious threat to vehicle safety.

Accordingly, it is imperative to invent a magneto-rheological fluid brake effective in enlarging the area of magnetic permeability of a magneto-rheological fluid under an applied magnetic field to increase a braking force and preventing a complete failure of the braking force.

SUMMARY

In view of the shortcomings of the conventional magneto-rheological fluid brake, the inventor of the present invention conducted extensive researches and experiments according to the inventor's years of experience in the related industry, and finally developed a magneto-rheological fluid brake effective in enlarging the area of magnetic permeability of a magneto-rheological fluid under an applied magnetic field to increase a braking force and preventing a complete failure of the braking force.

It is a primary objective of the present invention to provide a magneto-rheological fluid brake, wherein a magneto-rheological fluid is surrounded by a plurality of coils and a plurality of pole coils, such that the magneto-rheological fluid brake is effective in enlarging the area of magnetic permeability of a magneto-rheological fluid under an applied magnetic field to increase a braking force and preventing a complete failure of the braking force.

In order to achieve the above and other objectives, the present invention provides a magneto-rheological fluid brake comprising: a housing having an inner wall and an inner receiving chamber; a non-magnetically permeable separating ring received in the inner receiving chamber and spaced apart from the inner wall by a spacing, the non-magnetically permeable separating ring having an annular sidewall and an inner receiving space, the annular sidewall being penetrated by a plurality of through holes circumferentially disposed therein and equidistantly spaced apart from each other; a plurality of magnetically permeable blocks corresponding in quantity and position to the through holes, being circumferentially and isometrically disposed in the inner receiving space, and being equidistantly spaced apart from each other by a gap; a plurality of magnetically permeable bars corresponding in quantity and position to the magnetically permeable blocks and penetrating the through holes to connect with the magnetically permeable blocks, respectively, wherein a portion of each of the magnetically permeable bars is projected and exposed from the non-magnetically permeable separating ring, and a coil is wound around the projected and exposed portion of each of the magnetically permeable bars; an axle having two ends protruding from the housing, wherein a disc body is disposed around the axle, positioned between the two ends of the axle, and received in the inner receiving space, the disc body having an upper surface, a lower surface, and a circumferential side surface spaced apart from the magnetically permeable blocks by a first interval; an upper magnetically permeable block enclosedly engaged with the axle, coupled to the non-magnetically permeable separating ring from above, spaced apart from the upper surface of the disc body by a second interval in communication with the first interval, and wound around by an upper coil; a lower magnetically permeable block enclosedly engaged with the axle, coupled to the non-magnetically permeable separating ring from below, spaced apart from the lower surface of the disc body by a third interval in communication with the first interval, and wound around by a lower coil; and a magneto-rheological fluid for filling the first interval, the second interval, and the third interval.

Accordingly, the magneto-rheological fluid is surrounded by a plurality of coils and a plurality of pole coils, such that the magneto-rheological fluid brake is effective in enlarging the area of magnetic permeability of a magneto-rheological fluid under an applied magnetic field to increase a braking force and preventing a complete failure of the braking force.

BRIEF DESCRIPTION OF THE DRAWINGS

To enable persons skilled in the art to fully understand the objectives, features, and advantages of the present invention, the present invention is hereunder illustrated with specific embodiments in conjunction with the accompanying drawings, in which.

DETAILED DESCRIPTION

Figure 1:
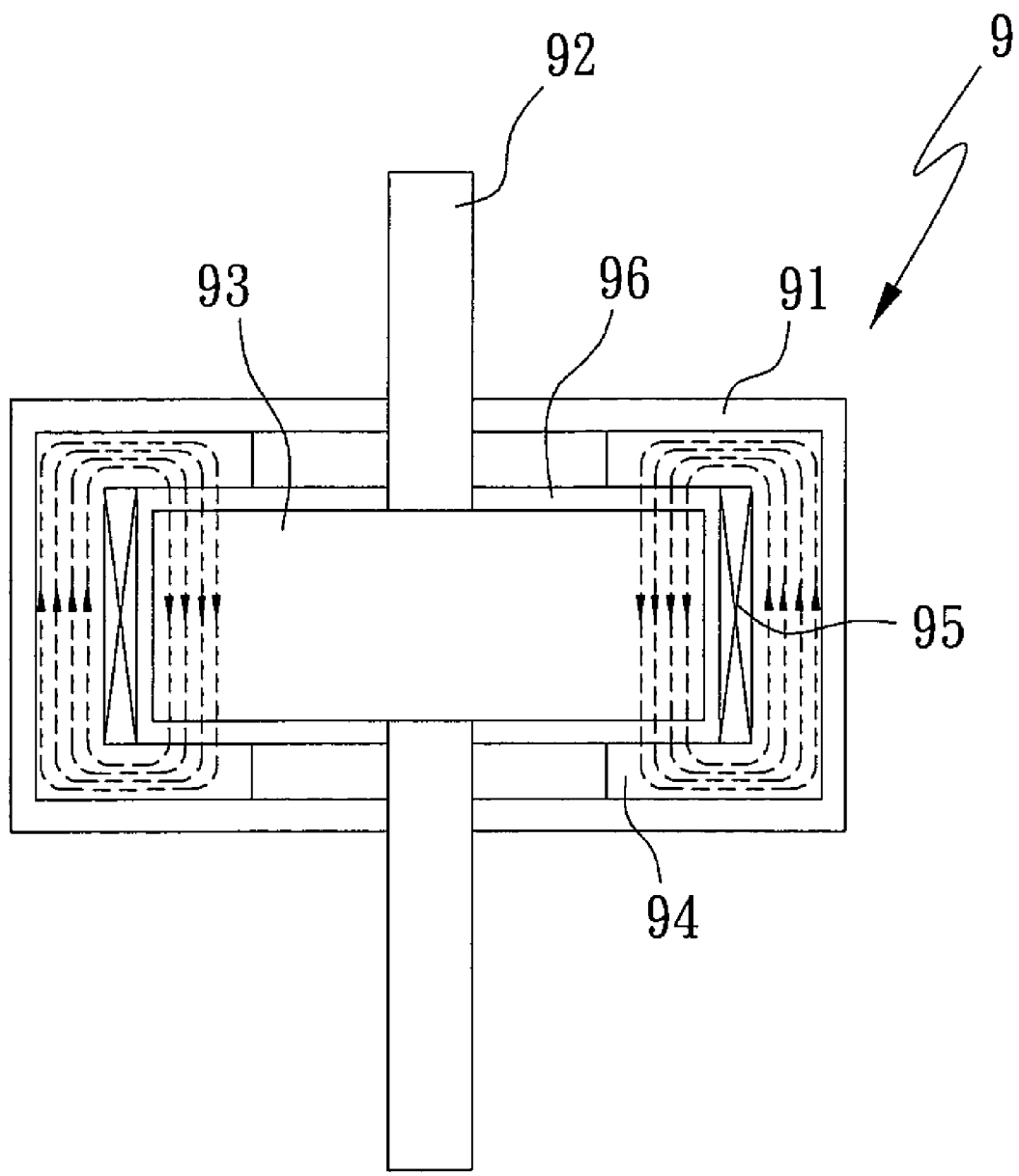
FIG. 1 is a cross-sectional view of a conventional magneto-rheological fluid brake.
Figure 2:
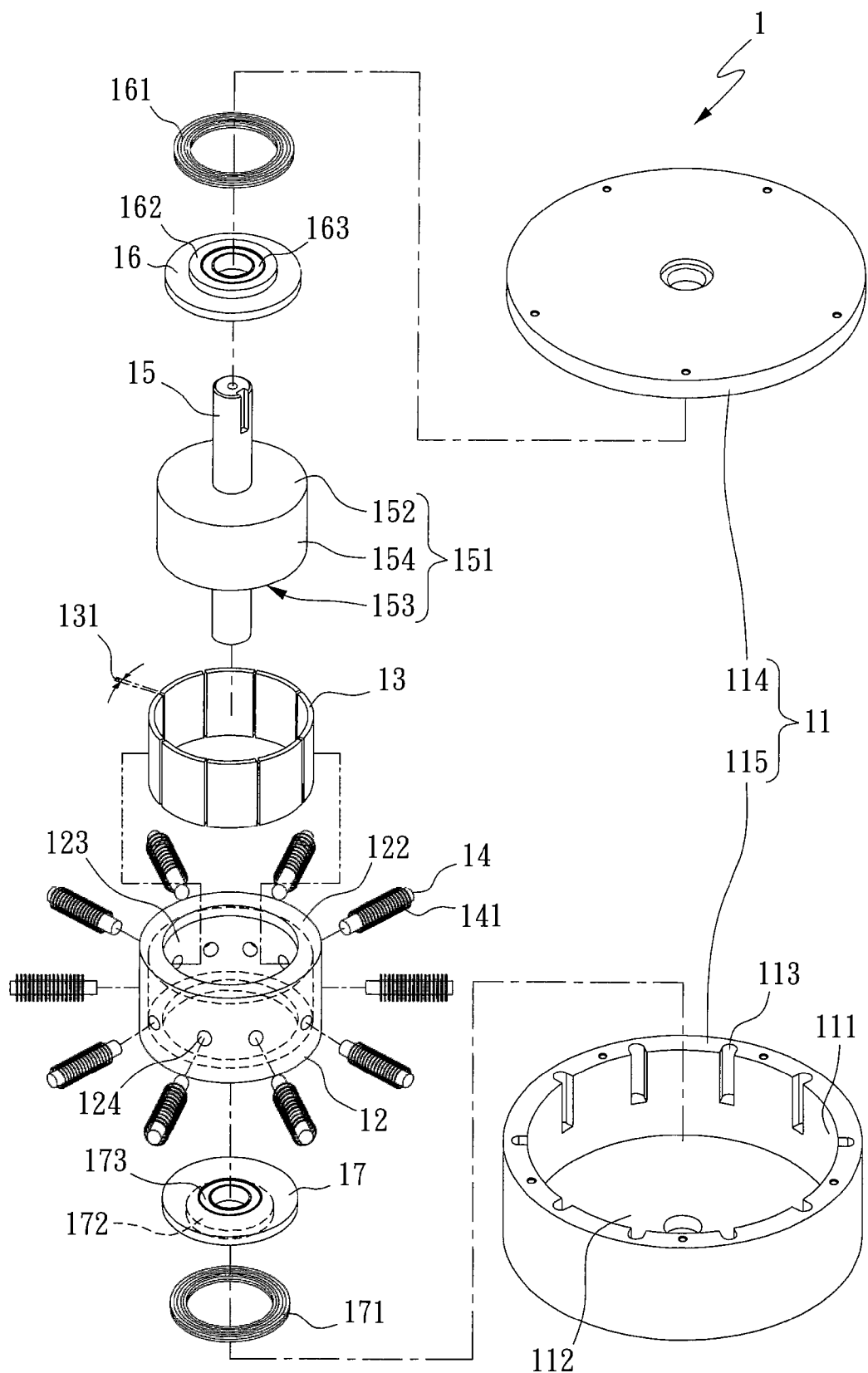
FIG. 2 is an exploded view of a magneto-rheological fluid brake according to a preferred embodiment of the present invention.
Figure 3:
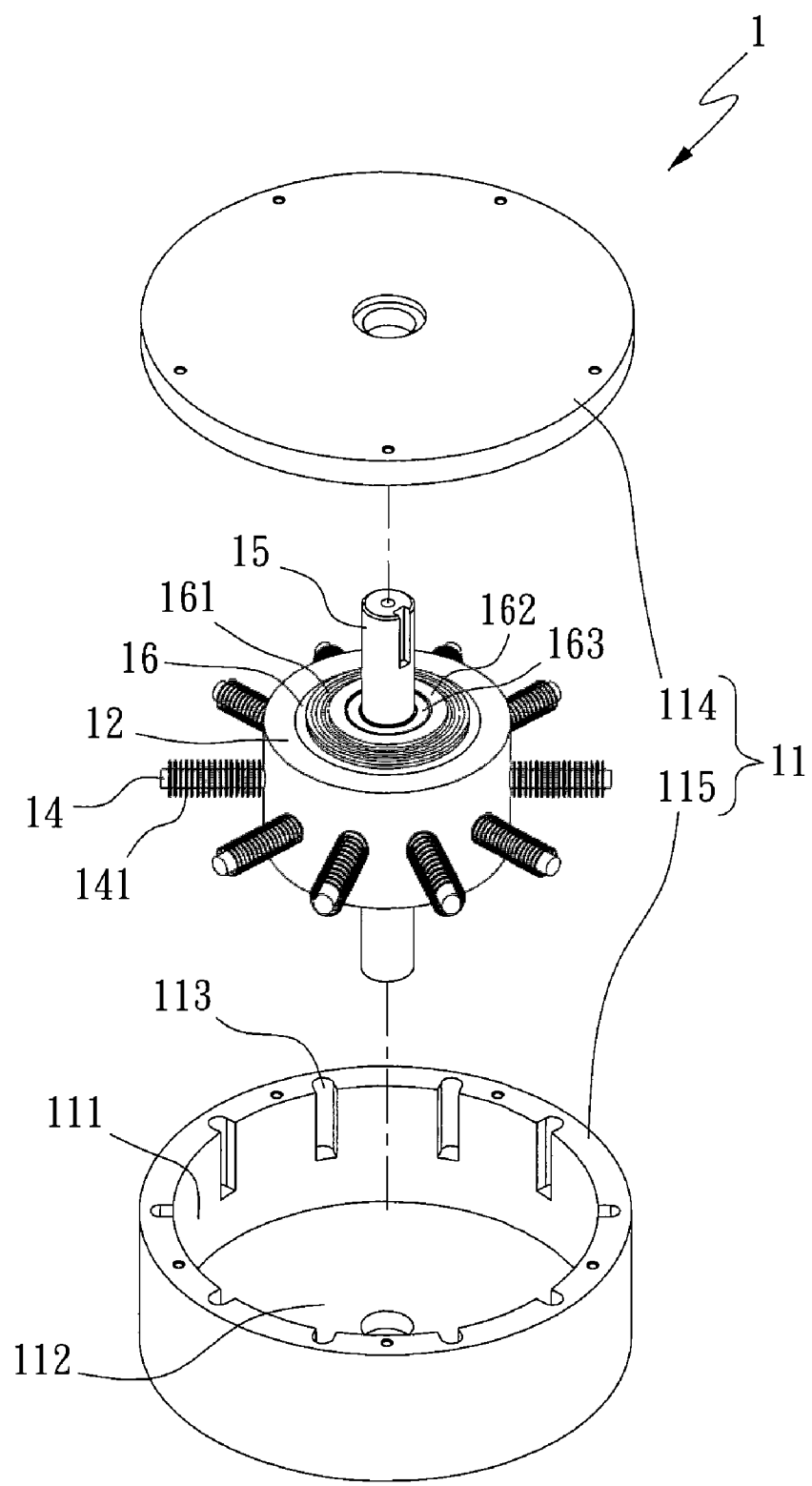
FIG. 3 is an assembly schematic view of the magneto-rheological fluid brake according to a preferred embodiment of the present invention.
Figure 5:
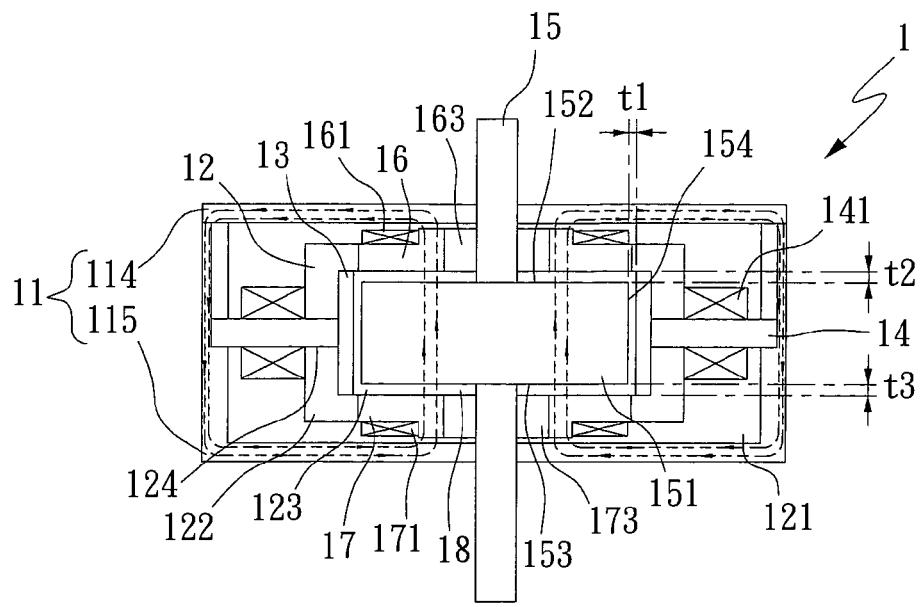
FIG. 5 is a cross-sectional view of the magneto-rheological fluid brake taken along line a-a of FIG. 4.

Referring to FIG. 2, there is shown an exploded view of a magneto-rheological fluid brake 1 according to a preferred embodiment of the present invention. As shown in the drawing, the magneto-rheological fluid brake 1 comprises a housing 11, a non-magnetically permeable separating ring 12, a plurality of magnetically permeable blocks 13, a plurality of magnetically permeable bars 14, an axle 15, a an upper magnetically permeable block 16, a lower magnetically permeable block 17, and a magneto-rheological fluid 18 (as shown in FIG. 5).

Figure 4:
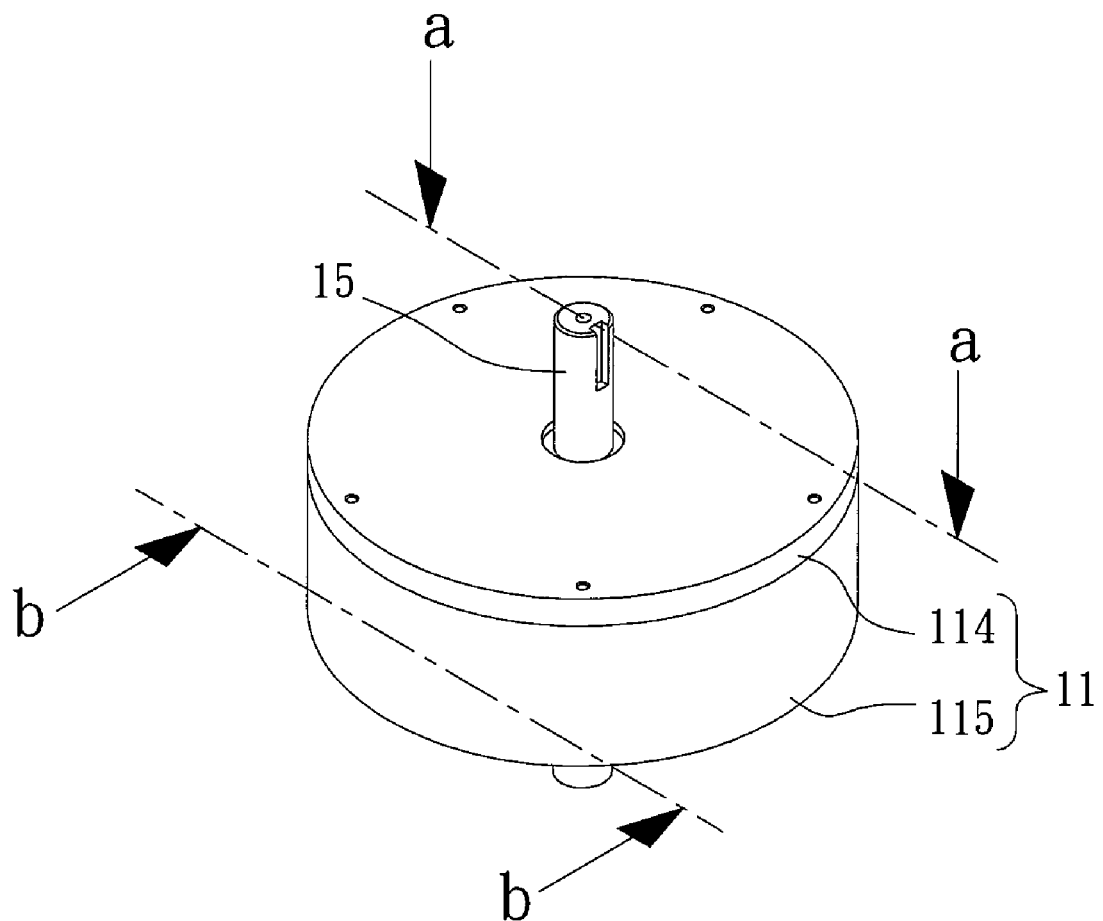
FIG. 4 is a perspective view of the magneto-rheological fluid brake according to a preferred embodiment of the present invention.

Referring to FIG. 3 through FIG. 6, there are shown an assembly schematic view (in FIG. 3), a perspective view (in FIG. 4), a cross-sectional view (in FIG. 5) taken along line a-a of FIG. 4, and a cross-sectional view (in FIG. 6) taken along line b-b of FIG. 4, of a magneto-rheological fluid brake according to a preferred embodiment of the present invention, respectively.

As shown in the drawings, the housing 11 comprises an inner wall 111 and an inner receiving chamber 112. In this embodiment, the housing 11 comprises an upper lid 114 and a lower base 115 coupled to each other. The inner wall 111 and the inner receiving chamber 112 are disposed at the lower base 115. A plurality of grooves 113 corresponding in quantity to the magnetically permeable bars 14 are disposed on the inner wall 111.

As shown in the drawings, the non-magnetically permeable separating ring 12 is received in the inner receiving chamber 112 of the housing 11 and spaced apart from the inner wall 111 of the housing 11 by a spacing 121. The non-magnetically permeable separating ring 12 has an annular sidewall 122 and an inner receiving space 123. The annular sidewall 122 is penetrated by a plurality of through holes 124 which are circumferentially disposed therein and equidistantly spaced apart from each other.

As shown in the drawings, the plurality of magnetically permeable blocks 13 correspond in quantity and position to the through holes 124. The magnetically permeable blocks 13 are circumferentially and isometrically disposed in the inner receiving space 123 of the non-magnetically permeable separating ring 12 and equidistantly spaced apart from each other by a gap 131. The plurality of magnetically permeable bars 14 correspond in quantity and position to the magnetically permeable blocks 13. The magnetically permeable bars 14 penetrate the through holes 124 to connect with the magnetically permeable blocks 13, respectively. A portion of each of the magnetically permeable bars 14 is projected and exposed from the non-magnetically permeable separating ring 12. A coil 141 is wound around the projected and exposed portion of each of the magnetically permeable bars 14. A disc body 151 is disposed around the axle 15, positioned between two ends of the axle 15, and received in the inner receiving space 123. The two ends of the axle 15 protrude from the housing 11. The disc body 151 has an upper surface 152, a lower surface 153, and a circumferential side surface 154. The circumferential side surface 154 is spaced apart from the plurality of magnetically permeable blocks 13 by a first interval t1.

An upper bearing 163 of the upper magnetically permeable block 16 is enclosedly engaged with the axle 15 and coupled to the non-magnetically permeable separating ring 12 from above. The upper magnetically permeable block 16 is spaced apart from the upper surface 152 of the disc body 151 by a second interval t2. The second interval t2 is in communication with the first interval t1. The upper magnetically permeable block 16 is wound around by an upper coil 161. A lower bearing 173 of the lower magnetically permeable block 17 is enclosedly engaged with the axle 15 and coupled to the non-magnetically permeable separating ring 12 from below. The lower magnetically permeable block 17 is spaced apart from the lower surface 153 of the disc body 151 by a third interval t3. The third interval t3 is in communication with the first interval t1. The lower magnetically permeable block 17 is wound around by a lower coil 171. The first interval t1, the second interval t2, and the third interval t3 are filled with the magneto-rheological fluid 18.

The plurality of through holes 124, the plurality of magnetically permeable blocks 13, and the plurality of magnetically permeable bars 14 are equal in quantity. In this embodiment, the plurality of through holes 124, the plurality of magnetically permeable blocks 13, and the plurality of magnetically permeable bars 14 total 10, respectively. One end of each of the magnetically permeable bars 14 is laterally inserted into a corresponding one of the through holes 124 on the annular sidewall 122 of the non-magnetically permeable separating ring 12 and connected to a corresponding one of the magnetically permeable blocks 13. The other end of each of the magnetically permeable bars 14 abuts against a corresponding one of the grooves 113 on the inner wall 111 of the housing 11.

In this embodiment, the magnetically permeable blocks 13 are each of an arch shape or any shape whereby the magnetically permeable blocks 13 can be disposed between the circumferential side surface 154 and the annular sidewall 122. The upper magnetically permeable block 16 has an upper ringlike protruding portion 162 which is wound around by the upper coil 161. The lower magnetically permeable block 17 has a lower ringlike protruding portion 172 which is wound around by the lower coil 171.

Figure 6:
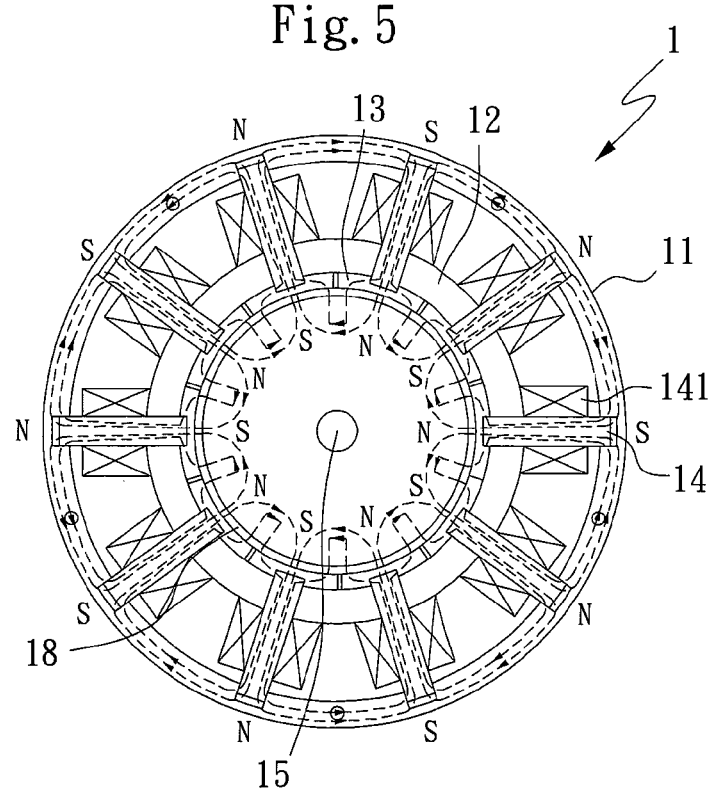
FIG. 6 is a cross-sectional view of the magneto-rheological fluid brake taken along line b-b of FIG. 4.

Hence, each of the magnetically permeable bars 14 and a corresponding one of the magnetically permeable blocks 13 (wherein the magnetically permeable bar 14 abuts against the magnetically permeable block 13) together form a T-shaped magnetically permeable block coil assembly. The T-shaped magnetically permeable block coil assembly, coupled with a magnetically permeable block coil assembly disposed between the upper magnetically permeable block 16 and the lower magnetically permeable block 17, contributes to a great increase in the effective area of a magnetic field in the directions of magnetic lines indicated by the arrows shown in FIG. 5 and FIG. 6. Also, as shown in FIG. 6, in the most preferred embodiment of the present invention, the magnetically permeable blocks 13 and the magnetically permeable bars 14 are of even numbers, respectively, and the magnetic fields generated by adjacent ones of the magnetically permeable bars 14 in conjunction with the coil 141 are opposite in direction.

Hence, as regards a magneto-rheological fluid brake of the present invention, the magneto-rheological fluid 18 is surrounded by a plurality of magnetic poles (the magnetically permeable blocks 13, the magnetically permeable bars 14, the upper magnetically permeable block 16, and the lower magnetically permeable block 17). The magnetic poles which surround the magneto-rheological fluid 18 are arranged according to the directions of magnetic fields so as to increase the area of magnetic permeability of the magneto-rheological fluid 18 under an applied magnetic field and thereby increase a braking force generated by the brake.

Furthermore, given the plurality of magnetic poles (the magnetically permeable blocks 13, the magnetically permeable bars 14, the upper magnetically permeable block 16, and the lower magnetically permeable block 17), the magneto-rheological fluid brake of the present invention overcomes the drawbacks of the prior art, namely a single magnetic pole (a coil) may be damaged, causing a loss of applied magnetic forces and thus a complete failure of a braking force.

In conclusion, a magneto-rheological fluid brake of the present invention is advantageously characterized in that:

1. The magneto-rheological fluid brake produces resistance to a shear stress by means of the chainlike alignment of a magneto-rheological fluid and thus achieves a braking effect; hence, the magneto-rheological fluid brake dispenses with substantial friction members and thus are not susceptible to wears and tears;

2. The magneto-rheological fluid brake is capable of electrical control of the chainlike alignment of the magneto-rheological fluid and thus advantageously characterized by continuity and a high degree of controllability of the strength of the braking force;

3. The magneto-rheological fluid brake comprises a plurality of magnetic poles arranged in a distributed manner and configured to enclose the magneto-rheological fluid completely, thereby enlarging the area of magnetic permeability of a magneto-rheological fluid under an applied magnetic field to increase a braking force;

4. The magneto-rheological fluid brake comprises a plurality of magnetic poles arranged in a distributed manner to thereby prevent an applied magnetic force from vanishing which might otherwise occur as a result of any damage caused to a single magnetic pole (a coil), thereby preventing a complete failure of the braking force;

5. The magneto-rheological fluid brake comprises two adjacent magnetic poles (the magnetically permeable blocks, the magnetically permeable bars) having internal magnetic lines running in opposite directions and magnetic poles (the upper magnetically permeable block, the lower magnetically permeable block) having internal magnetic lines running in head-on directions, such that the magneto-rheological fluid brake in its entirety is enclosed by the magnetic fields, thereby enhancing the total torque of a magneto-rheological fluid brake;

6. The magneto-rheological fluid brake comprises a non-magnetically permeable separating ring for fixing the magnetically permeable bars in place and separating the magneto-rheological fluid, such that the magneto-rheological fluid is hermetically sealed within the hermetically sealed space formed between the non-magnetically permeable separating ring and the upper and lower magnetically permeable blocks, thereby preventing the magneto-rheological fluid from coming into contact with a coil; and 7. The magneto-rheological fluid brake can be directly put under electrical control and thus is advantageously characterized by high performance, low noise, high response speed, no wears and tears, and long service life.

Analysis and simulation of the magneto-rheological fluid brake reveals optimal parameters thereof as follows:

| Dimensions of a magneto-rheological (MR) fluid brake | |
| --- | --- |
| Width of the magnetic field channel of the MR fluid | 0.4 mm |
| Diameter of the housing of the MR fluid brake | 96.6 mm |
| Height of the housing of the MR fluid brake | 43.7 mm |
| Diameter of the disc body of the MR fluid brake | 56 mm |
| Height of the disc body of MR fluid brake | 30 mm |
| Width of the magnetically permeable blocks of the MR fluid brake | 17.4 mm |
| Height of the magnetically permeable blocks of MR fluid brake | 30 mm |
| Width of the coil set of the MR fluid brake | 17.4 mm |
| Height of the coil set of the MR fluid brake | 30 mm |
| Length of the coil set of the MR fluid brake | 14 mm |
| Maximum input current | 1 A |
| Thread diameter of the coil | 0.4 mm |
| The number of the lateral winding turns of a single magnetic pole | 600 |
| The number of the upper and lower winding turns of a single magnetic pole | 200 |

Hence, the present invention meets the three requirements of patentability, namely novelty, non-obviousness, and industrial applicability. Regarding novelty and non-obviousness, the present invention discloses that a magneto-rheological fluid is surrounded by a plurality of coils and a plurality of pole coils, such that a magneto-rheological fluid brake is effective in enlarging the area of magnetic permeability of the magneto-rheological fluid under an applied magnetic field to increase a braking force and preventing a complete failure of the braking force. Regarding industrial applicability, products derived from the present invention meet market demands fully.

The present invention is disclosed above by preferred embodiments. However, persons skilled in the art should understand that the preferred embodiments are illustrative of the present invention only, but should not be interpreted as restrictive of the scope of the present invention. Hence, all equivalent modifications and replacements made to the aforesaid embodiments should fall within the scope of the present invention. Accordingly, the legal protection for the present invention should be defined by the appended claims.

What is claimed is:

1. A magneto-rheological fluid brake, comprising:

a housing having an inner wall and an inner receiving chamber;

a non-magnetically permeable separating ring received in the inner receiving chamber and spaced apart from the inner wall by a spacing, the non-magnetically permeable separating ring having an annular sidewall and an inner receiving space, the annular sidewall being penetrated by a plurality of through holes circumferentially disposed therein and equidistantly spaced apart from each other;

a plurality of magnetically permeable blocks corresponding in quantity and position to the through holes, being circumferentially and isometrically disposed in the inner receiving space, and being equidistantly spaced apart from each other by a gap;

a plurality of magnetically permeable bars corresponding in quantity and position to the magnetically permeable blocks and penetrating the through holes to connect with the magnetically permeable blocks, respectively, wherein a portion of each of the magnetically permeable bars is projected and exposed from the non-magnetically permeable separating ring, and a coil is wound around the projected and exposed portion of each of the magnetically permeable bars;

an axle having two ends protruding from the housing, wherein a disc body is disposed around the axle, positioned between the two ends of the axle, and received in the inner receiving space, the disc body having an upper surface, a lower surface, and a circumferential side surface spaced apart from the magnetically permeable blocks by a first interval;

an upper magnetically permeable block enclosedly engaged with the axle, coupled to the non-magnetically permeable separating ring from above, spaced apart from the upper surface of the disc body by a second interval in communication with the first interval, and wound around by an upper coil;

a lower magnetically permeable block enclosedly engaged with the axle, coupled to the non-magnetically permeable separating ring from below, spaced apart from the lower surface of the disc body by a third interval in communication with the first interval, and wound around by a lower coil; and a magneto-rheological fluid for filling the first interval, the second interval, and the third interval.

2. The magneto-rheological fluid brake of claim 1, wherein the inner wall has a plurality of grooves corresponding in quantity to the magnetically permeable bars abutting against the grooves, respectively.

3. The magneto-rheological fluid brake of claim 1, wherein the magnetically permeable blocks are each of an arch shape.

4. The magneto-rheological fluid brake of claim 1, wherein the housing comprises an upper lid and a lower base coupled together.

5. The magneto-rheological fluid brake of claim 4, wherein the inner wall and the inner receiving chamber is disposed at the lower base.

6. The magneto-rheological fluid brake of claim 1, wherein the upper magnetically permeable block has an upper ringlike protruding portion wound around by the upper coil.

7. The magneto-rheological fluid brake of claim 1, wherein the lower magnetically permeable block has a lower ringlike protruding portion wound around by the lower coil.

* * * * *